July 3, 1962
L. L. FRY
3,042,123
DIGGER BLADE
Filed Nov. 7, 1960
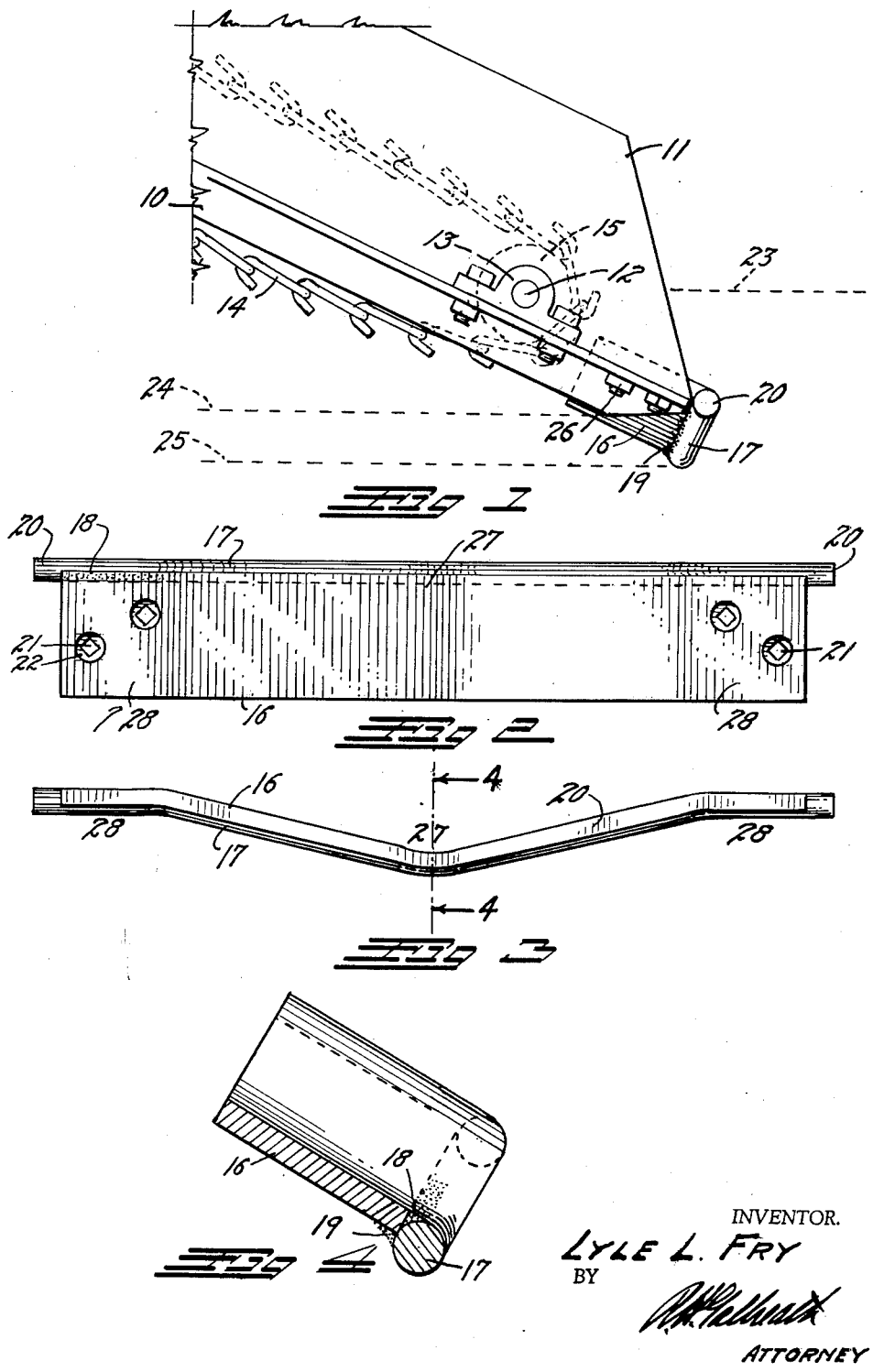
INVENTOR.
LYLE L. FRY
BY
ATTORNEY 3,042,123
DIGGER BLADE
Lyle L. Fry, Gering, Nebr., assignor to Lockwood Graders, Gering, Nebr., a corporation of Nebraska
Filed Nov. 7, 1960, Ser. No. 67,736
1 Claim. (Cl. 172—720)

This invention relates to a digger blade for a root crop harvester. The harvesting of root crops, such as potatoes, sugar beets, onions, etc., is usually accomplished by drawing an inclined digger blade along the row below the ground surface. The blade elevates the crop along with the surrounding earth and deposits the same on an upwardly inclined, vibrating bar chain. The bar chain sifts the earth from the crop and elevates the latter to the harvesting mechanism. Usually, rather broad, wide, flat, shovel-like digger blades are employed. These blades are exceedingly power-consuming, due to the relatively great submerged area, and also they act to break loose and elevate large surface clods of earth which are extremely difficult to separate from the crop being harvested.

The principal object of this invention is to provide a relatively narrow blade so curved that only the midportion of the blade beneath the crop will travel at maximum depth with the side portions traveling at a minimum depth so as to reduce power consumption and reduce the tendency to lift large surface clods.

The usual digger blade has a relatively sharp leading edge over which vines, roots and field trash become entangled to create excessive drag.

Another object of this invention is to provide a rounded front edge of relatively large radius over which the vines and field trash can slide away so as not to be carried by the blade.

A further object of the invention is to so construct the digger blade that it will exert a gathering action and concentrate the crop medially of the elevating chain and to provide a digger blade which will act to engage and break up clods beneath the ground surface instead of elevating them to the conveyor as the usual, wide, sharp, flat blades do.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 1 is a fragmentary side elevation of the lower extremity of a digger chain frame of a conventional potato digger showing the improved digger blade in place thereon;

FIG. 2 is a detail top view of the improved digger blade;

FIG. 3 is a detail rear edge view thereof; and

FIG. 4 is an enlarged medial cross section of the digger blade, taken on the line 4—4, FIG. 3, with the section tilted to position the blade on an incline substantially as it would be positioned when in use on a conventional potato harvester.

The invention is applicable to the harvesting of all types of root crops. It is more particularly applicable, however, and will be herein described as applied to a typical potato harvester.

In FIG. 1, elements of a conventional potato harvester are designated by numeral as follows: digger chain frame members 10, elevator side guards 11; lower chain shaft 12; chain shaft bearings 13; bar-type digger chain 14; and lower chain idler cones 15. The approximate position of the undug ground surface is indicated in broken line at 23, the depth traveled by the terminal portions of the improved digger blade is indicated at 24, and the depth traveled by the midportion of the digger blade is indicated in broken line at 25.

The improved digger blade comprises an elongated rectangular metallic band 16 formed from steel capable of attaining an exceedingly high polish such as plow share steel. The band is relatively thick and, when compared to the usual digger blades, is relatively narrow. For instance, for a typical potato harvester, the band would have a length of 26", a width of 4" and a thickness of ½".

A length of round steel shafting or rod 17 is welded to and along the front edge of the band 16. The rod 17 has a greater diameter than the thickness of the band 16 and is positioned with its upper edge in the plane of the upper surface of the band so that it will project below the lower surface thereof, as shown in FIG. 4. The welding is accomplished by means of an elongated upper V-shaped weld 18, the upper surface of which is ground to the plane of the upper surface of the band 16 and tangent to the upper surface of the rod 17. A longitudinal fillet weld 19 joins the lower surface of the band to the rod, as shown in FIG. 4.

The band 16, with its unitary rod 17, is deformed to present a depressed medial portion 27 having a wide V-shape terminating at its extremities in flat terminal portions 28. The terminal portions 28 are provided with rectangular bolt holes 21 which are countersunk, as shown at 22 to receive the heads of carriage bolts 26 by means of which the improved digger blade is secured to and between the lower extremities of the frame members 10. When in place, the rod 17 is positioned forwardly of the band 16 and the projecting extremities of the rod 17, indicated at 20, extend over the forward extremities of the frame members and the forward extremities of the side guards 11, as shown in FIG. 1.

The digger blade is positioned on a rearward and upward incline and travels forwardly beneath the ground surface 23 with the depressed medial portion 27 traveling below the crop, at the level indicated at 25, to lift the crop to the elevating digger chain 14 with the flat terminal portions 28 traveling at a higher and less resistant level, as indicated by the level line 24.

The rod 17 provides a relatively blunt, perfectly rounded forward edge on the blade and this rounded edge acts to strike and break up the hard surface clods instead of slicing and lifting the clods as the thin sharp edged blades do, so that the clod pieces sift through the chain 14. The inclined sides of the depressed medial portion 27 also act to bend the surface clods upwardly and inwardly to still further increase the clod breaking effect and the latter inclined sides also act to gather the crop toward the center of the elevating digger chain 14 for more efficient crop recovery.

The round rod 17 forming the front edge of the improved digger blade has a second advantage, in addition to the clod breaking effect. It has been found that when relatively thin blades are used, the forward edges thereof, if not previously sharpened, will become sharpened by travel through the earth. When this sharpened edge engages roots, vines, plant tops and the other surface trash, the latter will bend abruptly over the blade edge so as to be prevented from movement in any direction. As a result, the surface and subsurface trash will accumulate and build up upon the forward edge of both the blade and the forward extremities of the chain frame and guards. When this invention is used, the smooth rounded rod will ride smoothly over the vines and other trash since there is no possibility of engagement with the round smooth polished rod edge. Therefore, the buildup of trash on the blade is eliminated. Also, since the rod extremities 20 extend outwardly forwardly of the frame members 10 and the guards 11, a slip-over surface is provided at these points to prevent trash accumulation on the digger elements.

While a specific form of the improvement has been described and illustrated herein, it is to be understood that the same may be varied within the scope of the appended claim, without departing from the spirit of the invention.

Having thus described the invention what is claimed and desired to be secured by Letters Patent is:

A digger blade for a root crop harvester comprising: an elongated metallic band having substantially parallel front and rear edges adapted to travel longitudinally of and submerged beneath a crop row with its front edge substantially at right angles to the axis of said row; an elongated round rod welded to and along the front edge of said band to provide a semi-cylindrical front edge thereon, said rod having a greater diameter than the thickness of said band, the medial portion of said band being depressed in a relatively wide V-shape, the extremities of said band being in a common plane spaced above said depressed medial portion, said rod being deformed to follow the longitudinal contour of said band, said rod being longer than and projecting oppositely outward from the extremities of said band.

References Cited in the file of this patent
UNITED STATES PATENTS

| | | |
|---|---|---|
| Patent not numbered | Rice | July 29, 1833 |
| 1,351,948 | Fowler | Sept. 7, 1920 |
| 2,248,421 | Bouton | July 8, 1941 |
| 2,345,702 | Noble | Apr. 4, 1944 |
| 2,610,457 | Holden | Sept. 16, 1952 |

FOREIGN PATENTS

| | | |
|---|---|---|
| 613,434 | France | Aug. 24, 1926 |
| 808,293 | Germany | July 12, 1951 |